(12) United States Patent
Wen et al.

(10) Patent No.: US 8,831,379 B2
(45) Date of Patent: Sep. 9, 2014

(54) CARTOON PERSONALIZATION

(75) Inventors: Fang Wen, Beijing (CN); Xiao-Ou Tang, Beijing (CN); Ying-Qing Xu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 804 days.

(21) Appl. No.: 12/200,361

(22) Filed: Aug. 28, 2008

(65) Prior Publication Data

US 2009/0252435 A1 Oct. 8, 2009

Related U.S. Application Data

(60) Provisional application No. 61/042,705, filed on Apr. 4, 2008.

(51) Int. Cl.
*G06K 9/36* (2006.01)
*H04N 5/272* (2006.01)
*G06T 15/50* (2011.01)
*G06K 9/62* (2006.01)
*G06K 9/00* (2006.01)

(52) U.S. Cl.
CPC .......... *G06K 9/00228* (2013.01); *G06K 9/6203* (2013.01); *G06K 9/6257* (2013.01)
USPC ........... 382/284; 382/118; 382/181; 345/629; 345/648; 345/655

(58) Field of Classification Search
CPC ....... G06T 15/50; G06T 15/503; G06T 15/60; H04N 5/272; H04N 5/2723; G06K 9/4652; G06K 9/4661
USPC ........... 382/284, 118, 181; 345/629, 648, 655
See application file for complete search history.

(56) References Cited

U.S. PATENT DOCUMENTS

| | | | |
|---|---|---|---|
| 4,823,285 A * | 4/1989 | Blancato | 345/630 |
| 5,995,119 A | 11/1999 | Cosatto et al. | |
| 6,028,960 A | 2/2000 | Graf et al. | |
| 6,061,462 A | 5/2000 | Tostevin et al. | |
| 6,061,532 A | 5/2000 | Bell | |
| 6,075,905 A * | 6/2000 | Herman et al. | 382/284 |
| 6,128,397 A | 10/2000 | Baluja et al. | |

(Continued)

FOREIGN PATENT DOCUMENTS

| | | |
|---|---|---|
| WO | WO9602898 A1 | 2/1996 |
| WO | WO0159709 A1 | 8/2001 |

OTHER PUBLICATIONS

Zhang, et al. "Automated Annotation of Human Faces in Family Albums." In Multimedia '03: Proceedings of the eleventh ACM international conference on Multimedia. (2003): 355-358. Print.*

(Continued)

*Primary Examiner* — Michael A Newman
(74) *Attorney, Agent, or Firm* — Carole Boelitz Micky Minhas Lee & Hayes, PLLC (57) ABSTRACT

Embodiments that provide cartoon personalization are disclosed. In accordance with one embodiment, cartoon personalization includes selecting a face image having a pose orientation that substantially matches an original pose orientation of a character in a cartoon image. The method also includes replacing a face of the character in the cartoon image with the face image. The method further includes blending the face image with a remainder of the character in the cartoon image.

20 Claims, 7 Drawing Sheets

(56) References Cited

U.S. PATENT DOCUMENTS

| | | | |
|---|---|---|---|
| 6,226,015 B1 | 5/2001 | Danneels et al. | |
| 6,463,205 B1 | 10/2002 | Aschbrenner et al. | |
| 6,556,196 B1* | 4/2003 | Blanz et al. | 345/419 |
| 6,677,967 B2 | 1/2004 | Sawano et al. | |
| 6,690,822 B1 | 2/2004 | Chen et al. | |
| 6,707,933 B1* | 3/2004 | Mariani et al. | 382/118 |
| 6,792,707 B1 | 9/2004 | Setteducati | |
| 6,894,686 B2 | 5/2005 | Stamper et al. | |
| 6,937,745 B2 | 8/2005 | Toyama | |
| 7,039,216 B2 | 5/2006 | Shum et al. | |
| 7,092,554 B2 | 8/2006 | Chen et al. | |
| 7,167,179 B2 | 1/2007 | Nozawa | |
| 7,859,551 B2* | 12/2010 | Bulman et al. | 345/630 |
| 7,889,381 B2* | 2/2011 | Suzuki et al. | 358/1.18 |
| 7,953,275 B1* | 5/2011 | Wolfram | 382/167 |
| 2002/0012454 A1 | 1/2002 | Liu et al. | |
| 2003/0016846 A1 | 1/2003 | Chen et al. | |
| 2003/0021472 A1 | 1/2003 | Nichogi et al. | |
| 2003/0069732 A1 | 4/2003 | Stephany et al. | |
| 2004/0075866 A1* | 4/2004 | Thormodsen et al. | 358/1.18 |
| 2005/0013479 A1* | 1/2005 | Xiao et al. | 382/159 |
| 2005/0100243 A1 | 5/2005 | Shum et al. | |
| 2005/0129288 A1 | 6/2005 | Chen et al. | |
| 2005/0135660 A1 | 6/2005 | Liu et al. | |
| 2005/0212821 A1 | 9/2005 | Xu et al. | |
| 2006/0062435 A1* | 3/2006 | Yonaha | 382/118 |
| 2006/0082579 A1 | 4/2006 | Yao | |
| 2006/0092154 A1 | 5/2006 | Lee | |
| 2006/0115185 A1 | 6/2006 | Iida et al. | |
| 2006/0203096 A1 | 9/2006 | LaSalle et al. | |
| 2006/0204054 A1 | 9/2006 | Steinberg et al. | |
| 2007/0009028 A1 | 1/2007 | Lee et al. | |
| 2007/0031033 A1 | 2/2007 | Oh et al. | |
| 2007/0091178 A1 | 4/2007 | Cotter et al. | |
| 2007/0171228 A1 | 7/2007 | Anderson et al. | |
| 2007/0237421 A1* | 10/2007 | Luo et al. | 382/284 |
| 2008/0089561 A1* | 4/2008 | Zhang | 382/118 |
| 2008/0158230 A1 | 7/2008 | Sharma et al. | |
| 2008/0187184 A1* | 8/2008 | Yen | 382/118 |
| 2009/0252435 A1 | 10/2009 | Wen et al. | |

OTHER PUBLICATIONS

Zhou, et al. "Bayesian Tangent Shape Model: Estimating Shape and Pose Parameters via Bayesian Inference." Proceedings of the IEEE Conference on Computer Vision and Pattern Recognition. (2003): 109-116. Print.*

Perez, et al. "Poisson Image Editing." ACM Transactions on Graphics (TOG)—Proceedings of ACM SIGGRAPH 2003. 22.3 (2003): 313-318. Print.*

Agarwala, et al. "Interactive Digital Photomontage." ACM Transactions on Graphics (TOG)—Proceedings of ACM SIGGRAPH 2004. 23.3 (2004): 294-302. Print.*

Douglas, Mark. "Combining Images in Photoshop." . Department of Fine Arts at Fontbonne University, Aug. 19, 2005. Web. Jan. 31, 2012. <http://finearts.fontbonne.edu/tech/dig_img/bitmap/bm_ci.html>.*

Zhang et al. "Automated Annotation of Human Faces in Family Albums." In Multimedia '03: Proceedings of the eleventh ACM international conference on Multimedia. (2003): 355-358. Print.*

Zhou et al. "Bayesian Tangent Shape Model: Estimating Shape and Pose Parameters via Bayesian Inference." Proceedings of the IEEE Conference on Computer Vision and Pattern Recognition. (2003): 109-116. Print.*

Douglas, Mark. "Combining Images in Photoshop." Department of Fine Arts at Fontbonne University, Aug. 19, 2005. Web. Jan. 31, 2012. <http://finearts.fontbonne.edu/tech/dig_img/bitmap/bm_ci.html>.*

Perez et al. "Poisson Image Editing." ACM Transactions on Graphics (TOG)—Proceedings of ACM SIGGRAPH 2003. 22.3 (2003): 313-318. Print.*

Debevec, et al. "A Lightning Reproduction Approach to Live-Action Composition." SIGGRAPH 2002. (2002). Print.*

Debevec, Paul. "Rendering Synthetic Objects into Real Scenes: Bridging Traditional and Image-based Graphics with Global Illumination and High Dynamic Range Photography." SIGGRAPH 98. (1998). Print.*

Chen, et al., "PicToon: A Personalized Image-based Cartoon System", In the Proceedings of the Tenth ACM International Conference on Multimedia, ACM, Dec. 1-6, 2002, pp. 171-178.

Chiang, et al., "Automatic Caricature Generation by Analyzing Facial Features", available at <<http://imlab.cs.nccu.edu.tw/paper/dfgaccv2004.pdf>>, Asia Conference on Comupter Vision, 2004, 6 pgs.

Ruttkay, et al., "Animated CharToon Faces", available at least as early as Jun. 13, 2007, at <<http://kucg.korea.ac.kr/Seminar/2003/src/PA-03-33.pdf>>, 12 pgs.

Office action for U.S. Appl. No. 11/865,833, mailed on Jun. 9, 2011, Wen et al., "Cartoon Face Generation", 15 pages.

Office Action for U.S. Appl. No. 11/865,833, mailed on Oct. 31, 2011, Fang Wen, "Cartoon Face Generation", 12 pgs.

"Cartoon Maker v4.71", Liangzhu Software, retrieved Nov. 5, 2007, at <<http://www.liangzhuchina.com/cartoon/index.htm, 3 pgs.

Chen et al., "Face Annotation for Family Photo Album Management", Intl Journal of Image and Graphics, 2003, vol. 3, No. 1, 14 pgs.

Cui et al., "EasyAlbum: An Interactive Photo Annotation System Based on Face Clustering and Re-Ranking", SIGCHI 2007, 10 pgs.

Gu et al., "3D Alignment of Face in a Single Image", IEEE Intl Conf on Computer Vision and Pattern Recognition, Jun. 2006, 8 pgs.

Hays et al., "Scene Completion Using Millions of Photographs", ACM Transactions on Graphics, SIGGRAPH, Aug. 2007, vol. 26, No. 3, 7 pgs.

"IntoCartoon Pro 3.0", retrieved Nov. 5, 2007 at <<http://www.intocartoon.com/>>, Intocartoon.com, Nov. 1, 2007, 2 pgs.

Jia et al., "Drag-and-Drop Pasting", SIGGRAPH 2006, 6 pgs.

Perez et al., "Poisson Image Editing", ACM Transactions on Graphics, Jul. 2003, vol. 22, Issue 3, Proc ACM SIGGRAPH, 6 pgs.

"Photo to Cartoon", retrieved on Nov. 5, 2007 at <<http://www.caricature-software.com/products/photo-to-cartoon.html>>, Caricature Software, Inc., 2007, 1 pg.

Reinhard et al., "Color Transfer Between Images", IEEE Computer Graphics and Applications, Sep./Oct. 2001, vol. 21, No. 5, 8 pgs.

Suh et al., "Semi-Automatic Image Annotation Using Event and Torso Identification", Tech Report HCIL 2004-15, 2004, Computer Science Dept, Univ of Maryland, 4 pgs.

Tian et al., "A Face Annotation Framework with Partial Clustering and Interactive Labeling", IEEE Conf on Computer Vision and Pattern Recognition, Jun. 2007, 8 pgs.

Viola et al., "Robust Real-Time Face Detection" , Intl Journal of Computer Vision, May 2004, vol. 57, Issue 2, 18 pgs.

Wang et al, "A Unified Framework for Subspace Face Recognition", IEEE Transactions on Pattern Analysis and Machine Intelligence, Sep. 2004, vol. 26, Issue 9, 7 pgs.

Wang et al., "Random Sampling for Subspace Face Recognition", Intl Journal of Computer Vison, vol. 70, No. 1, 14 pgs, (2006).

Xiao et al., "Robust Multipose Face Detection in Images", IEEE Transactions on Circuits and Systems for Video Technology, Jan. 2004, vol. 14, Issue 1, 11 pgs.

Zhang et al., "Automated Annotation of Human Faces in Family Albums", Proc ACM Multimedia, 2003, 4 pgs.

Zhang et al., "Efficient Propagation for Face Annotation in Family Albums", Pro ACM Multimedia, 2004, 8 pgs.

Zhao et al., "Automatic Person Annotation of Family Photo Album", CIVR 2006, 10 pgs.

Zhao et al., "Face Recognition: A Literature Survey", ACM Computing Surveys, Dec. 2003, vol. 35, Issue 4, 61 pgs.

Zhou et al., "Bayesian Tangent Shape Model: Estimating Shape and Pose Parameters via Bayesian Inference", Computer Vision and Pattern Recognition, 2003 IEEE, 8 pgs.

* cited by examiner

CARTOON PERSONALIZATION

PRIORITY CLAIM

This application claims priority to U.S. Provisional Patent Application No. 61/042,705 to Fang et al, entitled "Cartoon Personalization System", filed Apr. 4, 2008 and incorporated herein by reference.

BACKGROUND

Computer users are generally attracted to the idea of personal identities in the digital world. For example, computer users may send digital greeting cards with personalized texts and messages. Computer users may also interact with other users online via personalized avatars, which are graphical representations of the computer users. Thus, there may be growing interest on the part of computer users in other ways of personalizing their digital identities.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Described herein are embodiments of various technologies for integrating facial features from a photographic image into a cartoon image. This integration process is also referred to as cartoon personalization. Cartoon personalization may enable the creation of cartoon caricatures of real individuals. Generally speaking, the process of cartoon personalization involves the selection of a photographic image and replacing facial features of a cartoon character present in the cartoon image with the facial features from the photographic image.

In one embodiment, cartoon personalization includes selecting a face image having a pose orientation that substantially matches an original pose orientation of a character in a cartoon image. The method also includes replacing a portion of the character in the cartoon image with the face image. The method further includes blending the face image with a remainder of the character in the cartoon image. Other embodiments will become more apparent from the following detailed description when taken in conjunction with the accompanying drawings.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

This disclosure is directed to embodiments that enable personalization of a cartoon image with features from real individuals. Generally speaking, cartoon personalization is the process in which facial features of a cartoon character in a cartoon image are replaced with the facial features of a person, as captured in a photographic portrait. Nevertheless, the process may also involve the replacement of other parts of the cartoon image with portions of photographs. For example, additional content of a cartoon image, such as, but not limited to, bodily features, clothes, cars, or even family pets, may be replaced with similar content captured in actual photographs. The integration of a cartoon image and a photograph may enable the generation of custom greeting material and other novelty items.

The embodiments described herein are directed to technologies for achieving cartoon personalization As described, the cartoon personalization mechanisms may enable the automatic or semi-automatic selection of one or more candidate photographs that contains the desired content from a plurality of photographs, dynamic processing of the selected candidate photograph for the seamless composition of the desired content into a cartoon image, and integration of the desired content with the cartoon image. In this way, the embodiments described herein may reduce or eliminate the need to create cartoon personalization by using manual techniques such as, but not limited to, cropping, adjusting, rotating, and coloring various images using graphics editing software. Thus, the embodiments described herein enable the creation of cartoon personalization by consumers with little or no graphical or artistic experience and ability. Various examples of cartoon personalization in accordance with the embodiments are described below with reference to FIGS. 1-8.

Exemplary Scheme

Figure 1:
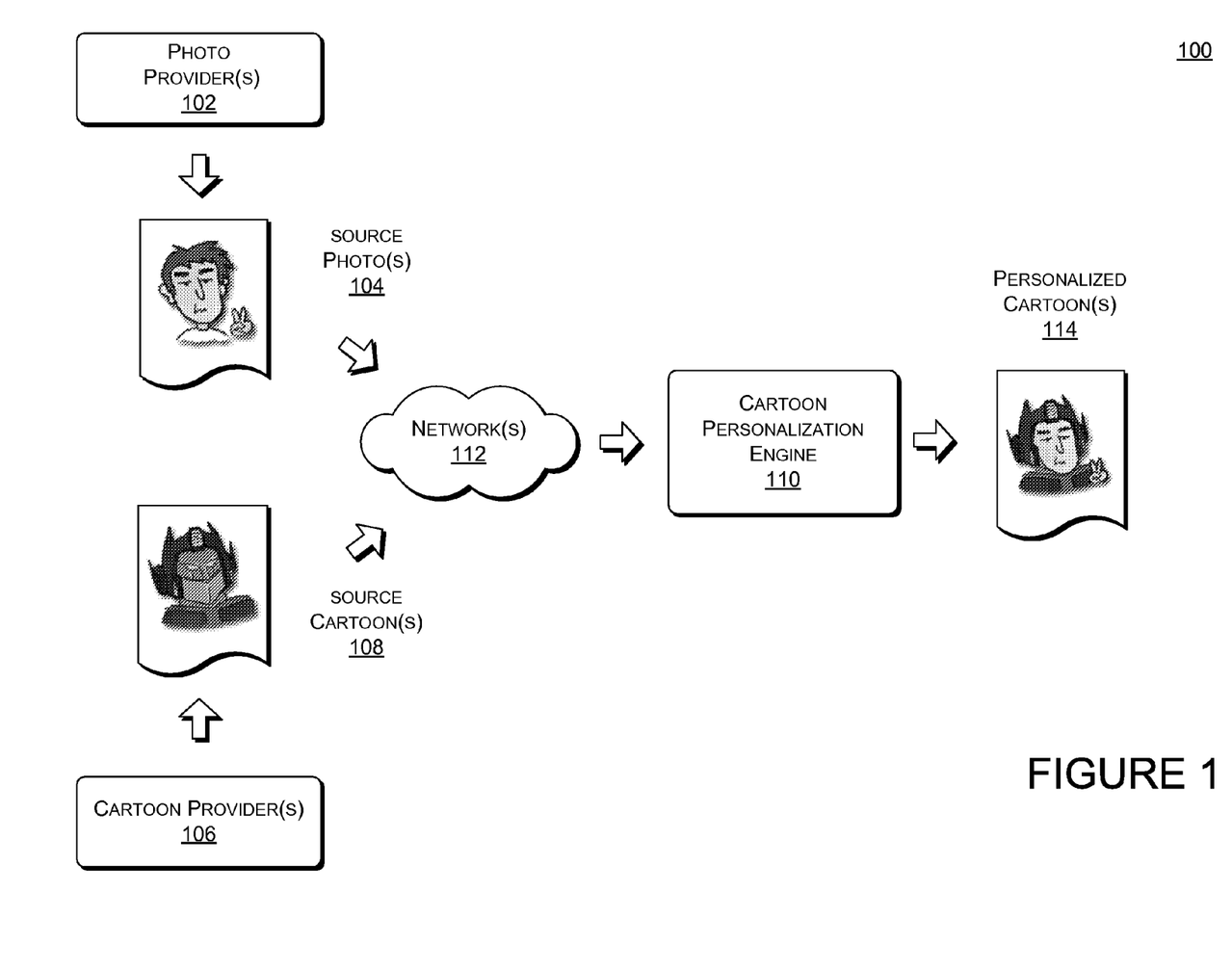
FIG. 1 is a simplified block diagram that illustrates an exemplary cartoon personalization process, in accordance with various embodiments.

FIG. 1 shows an exemplary cartoon personalization system 100. The cartoon personalization system 100 may receive one or more source images 104 from photo providers 102. The photo providers 102 may include anyone who possesses photographic images. For example, the photo providers 102 may include professional as well as amateur photographers. The source images 104 are generally images in electronic format, such as, but not limited to, photographic images, still images from video clips, and the like. For example, but not as a limitation, the source images 104 may be RBG images. The source images 104 may also be stored in a variety of formats, such as, but not limited to, JPEG, TIFF, RAW, and the like.

The cartoon personalization system 100 may receive one or more source cartoon images 108 from cartoon providers 106.

Cartoon providers 106 may include professional and amateur graphic artists and animators. The one or more source cartoon images 108 are generally artistically created pictures that depict cartoon characters or subjects in various artificial sceneries and backgrounds. In various embodiments, the cartoon image 108 may be a single image, or a still image from a video clip.

In the exemplary system 100, the source images 104 and the source cartoon images 108 may be transferred to a cartoon personalization engine 110 via one or more networks 112. The one or more networks 112 may include wide-area networks (WANs), local area networks (LANs), or other network architectures. However, in other embodiments, at least one of the source images 104 or the source cartoon images 108 may also reside within a memory of the cartoon personalization engine 110. Accordingly, in these embodiments, the cartoon personalization engine 110 may access at least one of the source images 104 or the source cartoon images 108 without using the one or more networks 1 12.

The cartoon personalization engine 110 is generally configured to integrate the source images 104 with the cartoon images 108. According to various embodiments, the cartoon personalization engine 110 may replace the facial features of a cartoon character from a cartoon image 108 with a face image from a source image 104. The integration of content from the source image 104 and the cartoon image 108 may produce a personalized cartoon 114.

Exemplary Components

Figure 2:
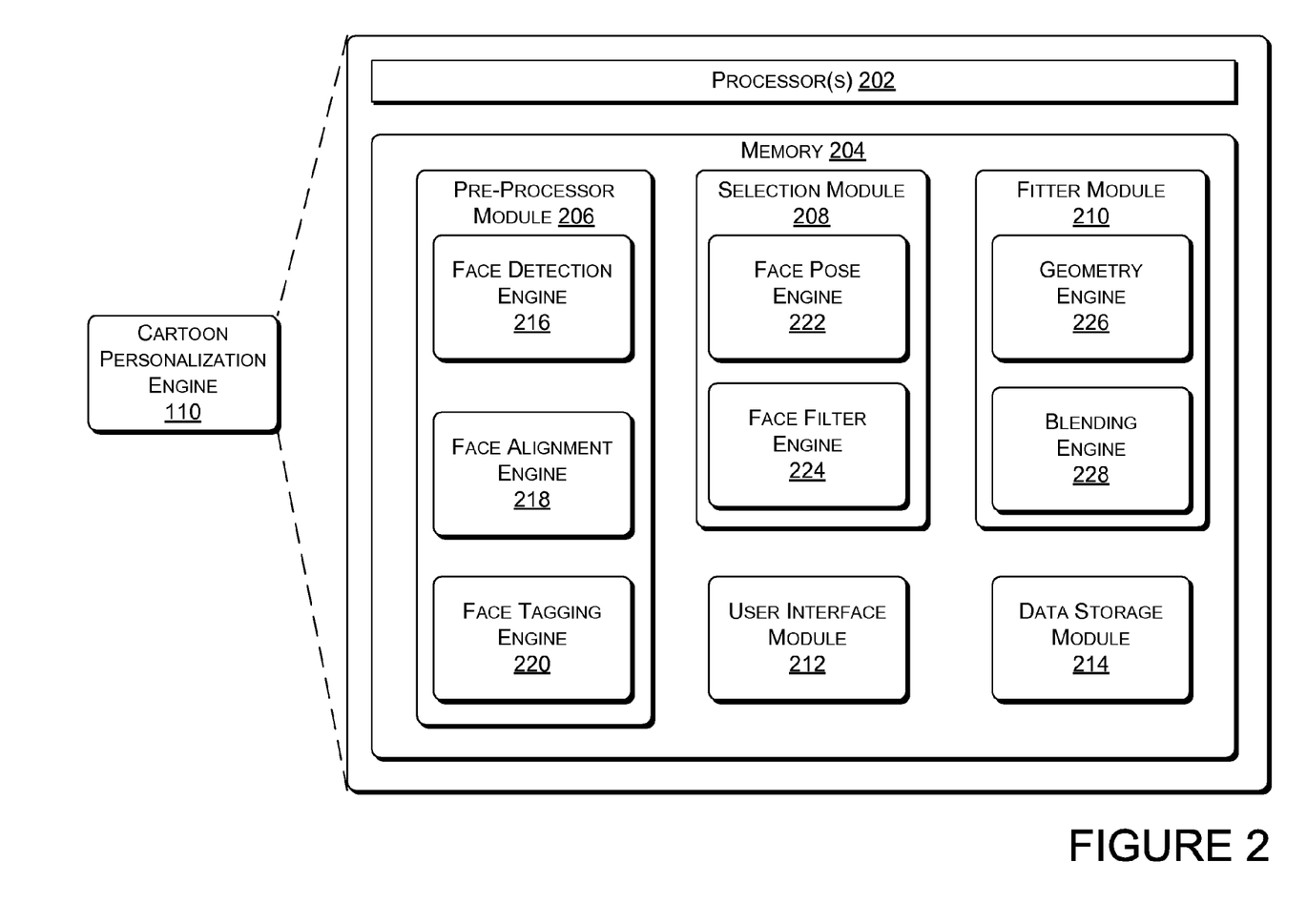
FIG. 2 is a simplified block diagram that illustrates selected components of a cartoon personalization engine, in accordance with various embodiments.

FIG. 2 illustrates selected components of one example of the cartoon personalization engine 110. The cartoon personalization engine 110 may include one or more processors 202 and memory 204. The memory 204 may include volatile and/or nonvolatile memory, removable and/or non-removable media implemented in any method or technology for storage of information, such as computer-readable instructions, data structures, program modules or other data. Such memory may include, but is not limited to, random accessory memory (RAM), read-only memory (ROM), electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and is accessible by a computer system.

The memory 204 may store program instructions. The program instructions, or modules, may include routines, programs, objects, components, and data structures that perform particular tasks or implement particular abstract data types. The selected program instructions may include a pre-processor module 206, a selection module 208, a fitter module 210, a user interface module 212, and a data storage module 214.

In turn, the pre-processor module 206 may include a face detection engine 216, a face alignment engine 218, and face tagging engine 220. The selection module 208 may include a face pose engine 222 and a face filter engine 224. The fitter module 210 may include a geometry engine 226, and a blending engine 228. In some embodiments, the exemplary cartoon personalization engine 110 may include other components associated with the proper operation of the engine.

The face detection engine 216 may implement various techniques to detect images of faces in photographs. In various embodiments, the face detection engine 216 may implement an "integral image" technique for the detection of faces in photographs.

Integral Image technique

The aforementioned "integral image" technique implemented by face detection engine 216 includes the use of "integral images" that enables the computation of features for face detection. The "integral image" technique also involves the use of a met-algorithm known as the AdaBoost learning algorithm to select a small number of critical visual features from a very large set of potential features for the detection of faces. The "integral image" technique may be further implemented by combining classifiers in a "cascade" to allow background regions of the photographic images that contain the faces to be quickly discarded so that the face detection engine 216 may spend more computation on promising face-like regions.

In some embodiments, the "integral image" technique may include the computation of rectangular features. For example, the integral image at location x, y contains the sum of the pixels above and to the left of x, y, inclusive:

$$ii(x, y) = \Sigma_{x' \leq x, y' \leq y} i(x', y') \tag{1}$$

where ii(x, y) is an integral image and i(x, y) is an original image. Using the following pair of recurrences:

$$s(x, y) = s(x, y-1) + i(x, y) \tag{2}$$

$$ii(x, y) = ii(x-1, y) + s(x, y) \tag{3}$$

where s(x, y) is the cumulative row sum, s(x, −1)=0, and ii (−1, y)=0, the integral image may be computed in one pass over the original image. Using the integral image any rectangular sum may be computed in four array references. Moreover, the difference between two rectangular sums may be computed in eight references. Since the two-rectangle features, as defined above, involve adjacent rectangular sums they can be computed in six array references, eight in the case of the three-rectangle features, and nine for four-rectangle features.

The implementation of the AdaBoost algorithm may involve the restriction of a weak learner, that is, a simple learning algorithm, to a set of classification functions where each function depends on a single feature. Accordingly, the weak learner may be designed to select the single rectangle feature which best separates the positive and negative examples. For each feature, the weak learner may determine the optimal threshold classification function, such that the minimum number of examples that are misclassified. Thus, a weak classifier (h(x, f, p, θ)) may consist of a feature (f), a threshold (θ), and a polarity (p) indicating the direction of the inequality:

$$h(x, f, p, \theta) = \begin{cases} 1, & \text{if } pf(x) < p\theta \\ 0, & \text{otherwise.} \end{cases} \tag{4}$$

where x is a 24×24 pixel sub-window of an image. Accordingly, the weak classifiers may be conceptualized as single node decision trees.

Furthermore, the weak classifiers may be implemented in a cascade in an algorithm to achieve increased detection performance while reducing computation time. In this algorithm, simpler classifiers may be used to reject the majority of sub-windows before more complex classifiers are called upon to achieve low false positive rates. Stages in the cascade may be constructed by training classifiers using the AdaBoost learning algorithm. For example, starting with a two-feature strong classifier, an effective face filter can be obtained by adjusting the strong classifier threshold to minimize false negatives. The initial AdaBoost threshold, $$\frac{1}{2}\sum_{t=1}^{T}\alpha_t,$$

may be designed to yield a low error rate on the training data. A lower threshold yields higher detection rates and higher false positive rates.

Accordingly, the overall form of the face detection process is that of a degenerate decision tree, also referred to as a "cascade." A positive result from the first classifier triggers the evaluation of a second classifier which has also been adjusted to achieve very high detection rates. A positive result from the second classifier triggers a third classifier, and so on. A negative outcome at any point leads to the immediate rejection of the sub-window.

Multiview Technique

In other embodiments, the face detection engine 216 may employ a "multiview" technique for the detection of faces in photographs. The "multiview" technique includes the use of a three-step face detection approach, in combination with a two-level hierarchy in-plane pose estimator, to detect photographs containing facial features.

The three-step detection approach may include a first step of linear filtering. Linear filtering, as implemented in the multiview technique, may include the use of the AdaBoost algorithm previous described. For example, given $(x_1, y_1) \ldots, (x_n, y_n)$ as the training set, where $y_i \in \{-1, +1\}$ is the class label associated with example $x_i$, the decision function may be the following:

$$H(x)=(a_1 f_1(x) > b_1) \wedge ((a_2 f_1(x) + rf_2(x)) > b_2) \quad (5)$$

where $\alpha_i$, $b_1$, and $r \in \{-1, 1\}$ are the coefficients which could be determined during the learning procedure. The first term in decision function (5) is a simple decision stump function, which may be learned by adjusting threshold according to the face/non-face histograms of this feature. The parameters in the second term could be acquired by a linear support vector machine (SVM). The target recall could be achieved by adjusting bias terms $b_i$ in both terms.

The three-step detection approach may also include a second step of implementing a boosting cascade. During the face detection training procedure, windows which are falsely detected as faces by the initial classifier are processed by successive classifiers. This structure may dramatically increase the speed of the detector by focusing attention on promising regions of the image. In some embodiments, efficiency of the boosting cascade may be increased using a boosting chain. In each layer of the boosting cascade, a classifier is adjusted to a very high recall ratio to preserve the overall recall ratio. For example, for a 20-layer cascade, to anticipate overall detection rates at 96% in the training set, the recall rate in each single layer may be 99.8% ($^{20}\sqrt{0.96}=0.998$) on average. However, such a high recall rate at each layer may result in decreasing sharp precision. Accordingly, a chain structure of boosting cascades may be implemented to remedy the decreasing sharp precision.

Further, during each step of the boosting chain, false rates may be reduced by optimization via the use of a linear SVM algorithm. The optimization is obtained by the linear SVM algorithm that resolves the following quadratic programming problem:

$$\text{Maximize: } L(\beta) = \sum_{i=1}^{n}\beta_i - \frac{1}{2}\sum_{i,j=1}^{n}\beta_i\beta_j y_i y_j (h(x_i) \cdot h(x_j)) \quad (6)$$

where the problem is subject to the constraints $$\sum_{i}^{n}\beta_i y_i = 0 \text{ and } C_i \geq \beta_i \geq 0, i = 1, \ldots, n.$$

Coefficient $C_i$ is set according to the classification risk $\omega$ and tradeoff constant C over the training set:

$$C_i = \begin{cases} \omega C, & \text{if } x_i \text{ is a face pattern} \\ C, & \text{otherwise.} \end{cases} \quad (7)$$

The solution of this maximization problem is denoted by $\beta^0 = (\beta_1^0 \beta_2^0 \ldots, \beta_n^0)$. The optimized $\alpha_t$ may then be given by $$\alpha_t = \sum_{i=1}^{n}\beta_i y_i h_t(x_i).$$

By adjusting the bias term b and classification risk $\omega$, the optimized result may be found.

The three-step detection system may also include a third step of post filtering. The posting filtering may include image processing and color filtering. Image processing may alleviate background, lighting, and contrast variations. It consists of three steps. First, a mask, which is generated by cropping out the four edge corner from a window, is applied to the candidate region. Second, a linear function may be selected to estimate the intensity distribution on the current window. By subtracting the plane generated by this linear function, the lighting variations could be significantly reduced. Finally, histogram equalization is performed. With this nonlinearly mapping, the range of pixel intensities is enlarged and thus improves the contrast variance which caused by camera input difference.

Color filtering may be achieved by adopting a $YC_bC_r$ space, where the Y mainly represents image grayscale information that is relevant to skintone color, and the $C_bC_r$ components are used for false alarm removal. Since the color of face and non-face images is distributed as nearly Gaussian in the $C_bC_r$ space, a two-degree polynominal function may be used as an effective function. For any point($c_b$, $c_r$) in the space($C_b$, $C_r$), the decision function can be written as:

$$F(c_r, c_b) = \text{sign}(a_1 c_r^2 + a_2 c_r c_b + a_3 c_b^2 + a_4 c_r + a_5 c_b + a_6) \quad (8)$$

which is a linear function in the feature space with dimension ($c_r^2$, $c_r c_b$, $c_b^2 c_r c_b$). Consequently, a linear SVM classifier is constructed in this five-dimensional space to separate skin tone color from the non-skin tone color.

For each face training sample, the classifier $F(c_r, c_b)$ may be applied to each pixel of face image. Statistics results can therefore be collected, where the grayscale value of each pixels corresponding to its ratio to be skin tone color in the training set. Thus, the darker the pixel, the less possible it may be a skin tone color.

In some embodiments, the three-step face detection may be further combined with a two-level hierarchy in-plane pose estimator to detect photographs containing facial features.

The two-level hierarchy in-plane pose estimator may include an in-plane orientation detector to determine the in-plane orientation of a face in an image with respect to the upright position. The pose estimator may further include an upright face detector this is capable of handling out-plane rotation variations in the range of $\Theta=[-45°, 45°]$.

The in-plane pose estimator includes the division of $\Phi$ into three sub ranges, $\Phi_{-1}=[-45°, -15°]$, $\Phi_0=[-15°, -15°]$, $\Phi_1=[15°, 45°]$. Further, the input image is in-plane rotated by ±30°. In this way, there are totally three images including the original image, and each corresponds to one of the three sub ranges, respectively. Third, in-plane orientation of each window on the original image is estimated. Finally, based on the in-plane orientation estimation, the upright multiview detector is applied to the estimated sub range at the corresponding location. In various embodiments, the pose estimator may adopt the coarse-to-fine strategy. The full range of in-plane rotation is first divided into two channels, and each one covers the range of $[-45°, 0°]$ and $[0°, 45°]$. In this step, only one Haar-like feature is used and results in the prediction accuracy of 99.1%. Subsequently, a finer prediction based on AdaBoost classifier with six Haar-like features may be performed in each channel to obtain the final prediction of the sub range.

It will be appreciated that while some of the face detection techniques implemented by the face detection engine 216 have been discussed, the face detection engine 216 may employ other techniques to detect face portions of photographic images. Accordingly, the above discussed face detection techniques are examples rather than limitations.

The face alignment engine 218 may be configured to obtain landmark points for each detected face from a photographic image. For example, in one embodiment, the face alignment engine 218 may obtain up to 87 landmarks for each detected face. These landmarks may include 19 landmark points for a profile, 10 landmark points for each brow, eight landmarks for each eye, 12 landmarks for a nose, 12 landmark points for outer lips, and 8 for inner lips.

In various embodiments, the face alignment engine 218 may make use of the tangent shape approximated algorithm referred to as the Bayesian Tangent Shape Model (BTSM). BTSM makes use of a likelihood, $P(y|x, \theta)$, that is a probability distribution of the grey levels conditional on the underlying shape, where $\theta$ represents the pose parameters, x represents the tangent shape vector, and y represents the observed shape vector. Assume $y^{old}$ is the shape estimated in the last iteration, by updating each landmarks of $y^{old}$ with its local texture, y, the observed shape vector may be obtained. The distance between observed shape y and the rue shape may be modeled as an adaptive Gaussian as:

$$y=sU_\theta x+c+\eta \quad (9)$$

where y is the observed shape vector, s is the scale parameter. Moreover, $$U_\theta = I_N \otimes \begin{pmatrix} \cos\theta & -\sin\theta \\ \sin\theta & \cos\theta \end{pmatrix},$$

represents the rotation matrix, $$c = I_N \otimes \begin{pmatrix} c_1 \\ c_2 \end{pmatrix},$$

represents the translation parameter ($\otimes$ denotes Krnecker product). Further, $\eta$ is the isotropic observation noise in the image space, where $\eta \sim N(0, \rho^2 I_{2n})$, $\rho$ is set by $\rho^2 = c\|y^{old}-y\|^2$, where c is a manually chosen constant. In this instance, "adaptive" denotes that the variance of the model is determined by the distance between y and $y^{old}$ in each iteration step.

Subsequently, the posterior of model parameters (b,s,c,θ) may be computed given the observed shape of y, where b represents the shape parameters. If the tangent shape x is known, the face alignment engine 218 may implement an expectation-maximization (EM) based parameters estimation algorithm.

For example, given a set of complete data {x,y}, the complete posterior of the model parameters is a product of the following two distributions:

$$p(b|x) \propto \exp\{-1/2[b^T\Lambda^{-1}b+\sigma^{-2}\|x-\mu-\Phi_r b\|^2]\} \quad (10)$$

$$p(\gamma|x,y) \propto \exp\{-1/2[\rho^{-2}\|y-X\gamma\|^2]\} \quad (11)$$

where $X=(x,x^*,e,e^*)$ and $\gamma=(s\cdot\sin\theta, s\cdot\sin\theta, c_1, c_2)^T$. Accordingly, by taking the logarithm and the conditional expectation, the following equation may be obtained:

$$Q(\gamma|\gamma_{old}) = \quad (12)$$
$$-\frac{1}{2}[[b^T\Lambda^{-1}b + \sigma^{-2}\langle\|x-\mu-\Phi_r b\|^2\rangle + \langle\rho^{-2}\|y-X\gamma\|^2\rangle] + const$$

Further, conditional expectations of x and $\|x\|^2$ may be obtained with respect to $P(x|y, c, s, \theta)$ as follows:

$$\langle x\rangle = \mu+(1-p)\Phi, b+p\Phi\Phi^T T_\theta^{-1}(y) \quad (13)$$

$$\langle\|x\|^2\rangle = \|\langle x\rangle\|^2+(2N-4)\delta^2 \quad (14)$$

where $p=\sigma^2/(\sigma^2+s^{-2}\rho^2)$ and $\delta^2=(\sigma^{-2}+s^2\rho^{-2})^{-1}$.

Subsequently, the face alignment engine 218 may maximize the Q-function over model parameters. The computation of the derivations of the Q-function may provide:

$$\tilde{b} = \Lambda(\Lambda+\sigma^2)^{-1}\Phi_r^T(\langle x\rangle - \mu) = \Lambda(\Lambda+\sigma^2)^{-1}\Phi_r^T\langle x\rangle \quad (15)$$

$$\tilde{\gamma} = \left(\frac{y^T\langle x\rangle}{\langle\|x\|\rangle^2}, \frac{y^T\langle x\rangle^*}{\langle\|x\|\rangle^2}, \frac{1}{N}\sum_{i=1}^N y_{1i}, \frac{1}{N}\sum_{i=1}^N y_{2i}\right) \quad (16)$$

Accordingly, the updating equations of each pose parameter are:

$$\tilde{s}=\sqrt{\tilde{\gamma}_1^2+\tilde{\gamma}_1^2}, \theta=a\tan(\tilde{\gamma}_1/\tilde{\gamma}_2), \text{ and } \tilde{c}=(\tilde{\gamma}_3,\tilde{\gamma}_4)^T \quad (17)$$

It will be appreciated that while some of the face alignment techniques implemented by the face alignment engine 218 has been discussed, the face alignment engine 218 may employ other techniques to obtain landmark points for each detected face. Accordingly, the above discussed face alignment techniques are examples rather than limitations.

The face tagging engine 220 may be configured facilitate the selection of detected and aligned faces from photographic images by grouping similar face images together. For example, the face tagging engine 220 may group face images of the same individual, as present in the different photographic images, into one group for identification and labeling.

In various embodiments, the face tagging engine 220 may use a three-stage technique to group similar face images. The stages may include offline pre-processing, online clustering, and online interactive labeling.

In the pre-processing stages, facial features from detected and aligned face images may be extracted. The extraction may be based on two techniques. For example, the facial features may be extracted from various face images using the local binary pattern (LBP) feature, a widely used feature for face recognition. In another example, facial feature extraction may be based on the recognition of scene features, as well as cloth contexture features and Color Correlogram features extracted from the human body areas present in the photographic images.

In the online clustering stage, the face tagging engine 220 may apply a spectral clustering algorithm that handles noise data to the LBP features, scene features, and cloth features to group similar face images into groups. In some embodiments, the face tagging engine may create a plurality of groups for the same person to account for face diversity.

In the online interactive stage, the face tagging engine 220 may ranking the face images in each group according to a confidence that each face image belongs in the group. For example, the face tagging engine 220 may use a first clustering algorithm that reorders the faces so that the faces are ordered from the most confident to the least confidence in a group. In another example, the face tagging engine 220 may use a second clustering algorithm that orders different groups of clustered face images according to confidence level.

The face tagging engine 220 may interact with the user interface module 212. In some embodiments, the face tagging engine 220 may have the ability to dynamically rearrange the order of face images and/or the groups of face images according to user input provided via the user interface module 212. The face tagging engine 220 may implement the rearrangement using methods such as linear discriminate analysis, support vector machine (SVM), or simple nearest-neighbor. Moreover, the face tagging engine 220 may be further configured to enable a user to annotate each face image and/or each group of face images with labels to facilitate subsequent retrieval or interaction.

It will be appreciated that while some of the face grouping and ranking techniques implemented by the face tagging engine 220 has been discussed, the face tagging engine 220 may employ other techniques to create and rank groups of similar face images. Accordingly, the above discussed face tagging techniques are examples rather than limitations.

The face pose engine 222 may be configured to determine the pose orientation, also commonly referred to as face orientation, of the face images. Pose orientation is an important feature in face selection. For instance, if the pose of the selected face is distinct from that of the cartoon image, the synthesized result may look unnatural.

In order to calculate the pose orientation, the face pose engine 222 may first estimate the symmetric axis in a 2D face plane of the face image. Suppose $\theta$ is the in-plane rotation of a face and C is the shift parameter, then $\theta$ and C may be estimated by optimizing the following symmetric criteria:

$$(\hat{\theta}, \hat{C}) = \mathrm{argmin}_{(\theta, C)} \Sigma_{i \in L} |u^T p_i + u^T p'_i|^2, \text{ s.t. } u = (\cos \theta, \sin \theta, C)^T \quad (18)$$

where L is the set of landmarks in the left nose and mouth, $p_i = (x_i, y_i, 1)^T$ is a point in L, and $p'_i$ is the corresponding point of $p_i$ in the right part of the face. The points in the nose and mouth to estimate the symmetric axis may be especially ideal for the calculation of pose orientation as points far away from the symmetric axis tend increase the amount of effect caused by 3D rotation.

Figure 3:
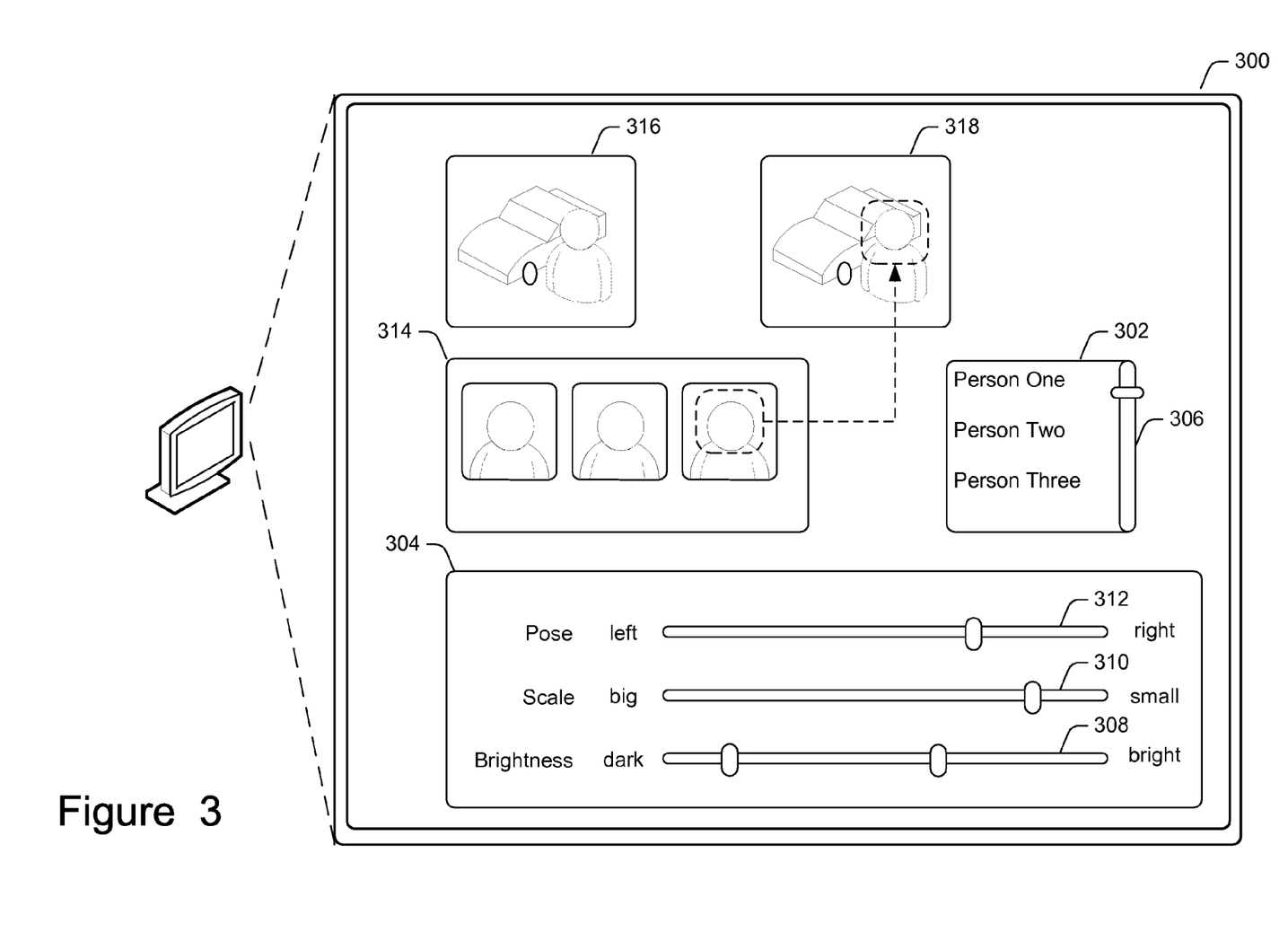
FIG. 3 is an exemplary screen rendering that illustrates a user interface that enable a user to interact with the user interface module, in accordance with various embodiments of cartoon personalization.

Following the calculation of $(\hat{\theta}, \hat{C})$ from criteria (18), the distance between the symmetric axis and points in the left and right face are calculated as:

$$d_l = \Sigma_{i \in L'} \hat{u}^T p_i, \, d_r = \Sigma_{i \in R'} \hat{u}^T p_i, \quad (19)$$

where $\hat{u} = (\cos \hat{\theta}, \sin \hat{\theta}, \hat{C})^T$, and L' and R' are the set of points excluding nose and mouth in left and right respectively. The final pose orientation may be calculated as:

$$o = \frac{d_r}{d_l} \quad (20)$$

for the frontal face $o=1$, for the right-viewed face $o>1$, and for the left-viewed face $0<1$. The calculation of the poses by the face pose engine 222 enables the matching of face images to the characters in cartoon images. In one embodiment, the face pose engine 222 may include an algorithm that sorts a plurality of face images according to pose orientation. The face images may then be stored in the data storage module 214. As further described below, the face pose engine 222 may interact with a user interface module 212 to enable a user to view and select face images of the desired orientation.

The face filter engine 224 may be configured to filter out face images that are not suitable for transference to a cartoon image. In various embodiments, the face filter engine 224 may filter out face images that exceed predetermined brightness and/or darkness thresholds. Faces that exceed the predetermined brightness and/or darkness thresholds may not be suitable for integration into a cartoon image. For example, when a face from a photographic image that is too dark is inserted into the head of a character in a cartoon image, the face may cause artifacts. Moreover, since faces with size much smaller than that of the cartoon template may cause blurring in the synthesis result, the face filter engine 224 may also filter out face images that are below a predetermined resolution.

In some embodiments, given that $l_i$ denotes an illumination of point i on a face image, and the mean value of illumination of all points in the face may be denoted as $l_m$, the brightness of the face may be expressed as:

$$l_m = \frac{1}{N} \sum_i l_i, \quad (21)$$

where N is the point number of the face. Accordingly, the face filter engine 224 may use the following brightness filter: given two threshold brightness values, $l_{min}$ and $l_{max}$, if a face meets the criteria $l_{min} \leq l_m \leq l_{max}$, the face is an acceptable face image for integration with a cartoon image. Otherwise, the face is eliminated as a potential candidate for integration with a cartoon image.

In other embodiments, given that the width and height of a cartoon image are $w_c$ and $h_c$, and the width and height of the face are $w_f$ and $h_f$. For a given ratio s, face filtering based on resolution may be implemented as follows: if $w_f/w_c \geq s$ & $h_f/h_c \geq s$, the face filter engine 224 may designate the face as having an acceptable resolution. Otherwise, the face filter engine 224 may be filter out due to the lack of proper resolution.

The geometry engine 226 may be configured to geometrically fit a selected face image to a cartoon image. In other words, the geometry engine 226 may integrate a face image into a cartoon image by changing the appearance of the face image.

The geometry engine 226 may implement a two part algorithm to blend a selected face into a cartoon image. The first part may include determine the place in the cartoon image that the face should be positioned. The second part may include estimating the transformation of the face, that is, warp the face image to matched the cartoon image.

In various embodiments, the geometry engine 226 may estimate the affine transform matrix Â via the following equation:

$$\hat{A}=\text{argmin}_A \Sigma_{i \in M}|Ap_i-p'_i|^2 \quad (22)$$

where A is a 3×3 affine matrix, M is the set of landmarks in the face image, $p_i$ is a landmark in the face, and $p'_i$ is the corresponding point in the cartoon image, where $p_i$ and $p'_i$ are represented in a homogenous coordinates system. After estimating the affine transformation, for a point p in the selected face, the corresponding coordinate in the cartoon image $p'=\hat{A}p$.

It will be appreciated that while some of the geometric fitting techniques implemented by the geometry engine 226 have been discussed, the geometry engine 216 may employ other techniques to geometrically fit a face image into a cartoon image. Accordingly, the above discussed face alignment techniques are examples rather than limitations.

The blending engine 228 may be configured to blend a face image and a host cartoon image following the insertion of face image into the cartoon image. To conduct appearance blending, the blending engine 228 may calculate a face mask indicating the region Ω where the face is inserted. The face mask may be obtained by calculating a convex hull of face image landmarks. In order to accomplish appearance blending, the blending engine 228 may perform three operations. The first operation includes the application of shading to the integrated image. The second operation includes illumination blending, which may make the illumination appear natural in the integrated image. The third operation includes color adjustment, which adjusts the real face color to match the face color in the original cartoon image.

In various embodiments, the blending engine 228 may convert a color RGB image into a L*a*b* color space. The "L" channel is the illumination channel, and "a*b*" are the color channels. In these embodiments, shading application and illumination blending may be performed on the "L" channel, while color adjustment is performed on the "a*b*" channels.

Since photographs may be taken in different environments, the face images in those photographs may have different shading than the faces in cartoon images. In order to match the shading of a face image from a photograph with the shading of a face in a cartoon image, as well as make the overall integrated image look natural, the blending engine 228 may implement cartoon shading on the face image. In one embodiment, the blending engine 228 may sample the cartoon image to obtain skin color information. For example, "illumination" of the cartoon image, as depicted by the cartoon image creator, implies shading information, as regions with shading are darker than others. Accordingly, the blending engine may use this illumination information to provide shading to the face image.

In one embodiment, suppose that the shading of a cartoon image in the illumination channel is $u^c$. The shading includes K uniform color regions and the illumination value for each region k is $u^c(k)$. Further, the illuminated image of the warped face may be denoted as u, and $u_p$ represents the illumination of point p. The blending engine 228 may first find all points in the face whose corresponding points belong to the same region in the cartoon skin image. Suppose that the corresponding point of p belongs to region k. Then the new illumination value of p may be set by the blending engine 228 as:

$$u'_p = \frac{u_p \cdot u^c(k)}{\bar{u}(k)} \quad (23)$$

where $\hat{u}(k)$ is the mean illumination value of all points whose correspondences in the cartoon image belong to region k. Once the new illumination values are computed, the blending engine 228 may the shading information to the face image in the integrated image.

The blending engine 228 may further provide illumination blending to an integrated image. The illumination blending may occur after shade matching as described above. Illumination blending naturally blends the illumination image u into the region Ω (face mask) by keeping illumination smooth across δΩ, the boundary of Ω. The blending engine 228 may perform illumination blending via Poisson Blending. In one embodiment, the Poisson approach may formulate the blending as the following variational energy minimization problem:

$$J(u')=\min \int_\Omega |\nabla u'-v|^2 dxdy, \text{ s.t. } u'|_{\partial\Omega}=f \quad (24)$$

where u is the unknown function in Ω, v is the vector field in Ω, and f is the cartoon image on δΩ. Generally, v is the gradient field of the image u, i.e. v=∇u. Further, the minimization problem may be discretized to be a sparse linear system, and the blending engine 228 may solve the system using the Gauss-Seidel method. In some embodiments, the blending engine 228 may contract the face mask so that its boundary does not coincide with the boundary of the face image.

The blending engine 228 may be further configured to perform color adjustment on the integrated image. In various embodiments, the blending engine 228 may determine the skin color of a face image and transform the real face colors into skin color present the cartoon image. As described above, this process is performed in "a*b*" color channels. To estimate the skin color of the face image, the face is clustered into K (where K=6) components via the Gaussian Mixture Model (GMM). Each component is represented as ($m_k$, $v_k$, $w_k$), where $m_k$, $v_k$, and $w_k$ are the mean, variance, and weight of the kth component. Intuitively, the largest component may be the skin color component, denoted as ($m_s$, $v_s$, $w_s$), and the others are the non-skin components.

After skin component is obtained, the blending engine 228 may label each point in the face image via a simple Bayesian inference. The posterior of point p belonging to the skin point is:

$$P(p \in \{\text{skin}\}) = \frac{G(m_s, v_s, p)w_s}{\sum_{k=1}^{K} G(m_k, v_k, p)w_k} \quad (25)$$

where $G(m_k, v_k, p)$ is the likelihood of point p belonging to the kth GMM component. If $P(p \in \{\text{skin}\}) > 0.5$, then point p may be a skin point. Otherwise, point p is a non-skin point. After labeling the points, the blending engine 228 may modify the face color in the face image to the face color in the cartoon image.

In one embodiment, suppose that p is a skin point, its original color is $c_p$ (values in "a*b*" channels), and the modified color is $C'_p$, then the blending engine 228 may implement the following simple linear transform to map the center of the skin component to the center of the skin color of the cartoon image:

$$C'_p=c_p-m_s+c_c \quad (26)$$

where $m_s$ is the mean of skin component and $c_c$ is the center of the skin color of the cartoon image. The colors of non-skin points are kept unchanged.

It will be appreciated that while some of the image shading and blending techniques implemented by the blending engine 228 have been discussed, the blending engine 228 may employ other techniques to shade and blend the face image with the cartoon image. Accordingly, the above discussed shading and blending techniques are examples rather than limitations.

The user interface module 212 may be configured to enable a user to provide input to the various engines in the prepreprocessor module 206, the selection module 208, and the fitter module 210. The user interface module 212 may interact with a user via a user interface. The user interface may include a data output device such as a display, and one or more data input devices. The data input devices may include, but are not limited to, combinations of one or more of keypads, keyboards, mouse devices, touch screens, microphones, speech recognition packages, and any other suitable devices or other electronic/software selection methods.

In various embodiments, the user interface module 212 may enable a user to supply input to the face tagging engine 220 to group similar images together, as described above, as well other engines. The user interface module 212 may also enable the user to supply the minimum and maximum brightness threshold values to the face filter engine 224. In other embodiments, the user interface module 212 may enable the user to review, then accept or reject the processed results produced by the various engines at each stage of the cartoon personalization, as well as to add, select, label and/or delete face images and groups of face images, as stored in the cartoon personalization engine 110. Additional details regarding the operations of the user interface module 212 are further described with respect to FIG. 3.

The data storage module 214 may be configured to store data in a portion of memory 204 (e.g., a database). In various embodiments, the data storage module 214 may be configured to store the source photos 104 and the source cartoon images 108. The data storage module 214 may also be configured to store the images derived from the source photos 104 and/or source cartoon 108, such as any intermediary products produced by the various modules and engines of the cartoon personalization engine 110.

FIG. 3 is an exemplary screen rendering that illustrates a user interface 300 that enable a user to interact with the user interface module 212, in accordance with at least one embodiment of cartoon personalization. The user interface 300 may include a photo group selection interface 302, and a modulator interface 304.

The photo group selection interface 302, which may include scroll control 306, may be configured to enable a user to select a group of face images from a plurality of groups for possible synthesis with a cartoon image. The plurality of groups may have been organized by the face tagging engine 220, with input from the user. Further, the user may have provided each group with a label. For example, a first group of face images are images of a particular individual, and may be grouped under a label "Person One." Likewise, a second group of face images belong to a second individual, and may be grouped under a label "Person Two." Accordingly, the user may use the scroll control 306 to select the desired group of images for potential synthesis with the cartoon image, if there are more groups that are capable of being simultaneously displayed by the photo group selection interface 302. In turn, the display area 314 may be configured to display the selected face images. It will be appreciated that the scroll control 306 may be substituted with a suitable control that performs the same function.

The modulator interface 304 may include a "brightness" control 308, a "scale" control 310, and a "pose" control 312. Each of the controls 308-312 may be the form of a slider bar, wherein different positions on the bar correspond to gradually incremented differences in settings. Nevertheless, it will be appreciated that the controls 308-312 may also be implemented in other forms, such as, but not limited to, a rotary-style control, arrow keys that manipulate numerical values, etc., so long as the control provides gradually incremented settings.

The "brightness" control 308 may be configured to enable a user to eliminate face images that that are too dark or too bright. For example, depending on the bright and dark thresholds set using the positions on the slider bar of the control 308, face images falling outside the range of brightness may be excluded as candidate images for potential integration with a cartoon image. In turn, the display area 314 may display face images that have been selected based on the bright and dark thresholds.

The "scale" control 310 may be configured to enable a user to eliminate face images that are that are too small. Face images that are too small may need scaling during synthesis with a cartoon image, which may result in the blurring of the image due to inadequate resolution. Accordingly, depending on the particular minimum size specified using the "scale" control 310, one or more face images may be excluded. In turn, the display area 314 may display face images that have been selected based on the minimum size threshold.

The pose" control 312 may be in the form of a slider bar that represents the pose orientation. Different positions of the bar correspond to different pose orientations. The operation of the "pose" control may be further illustrated with respect to FIG. 4.

Figure 4:
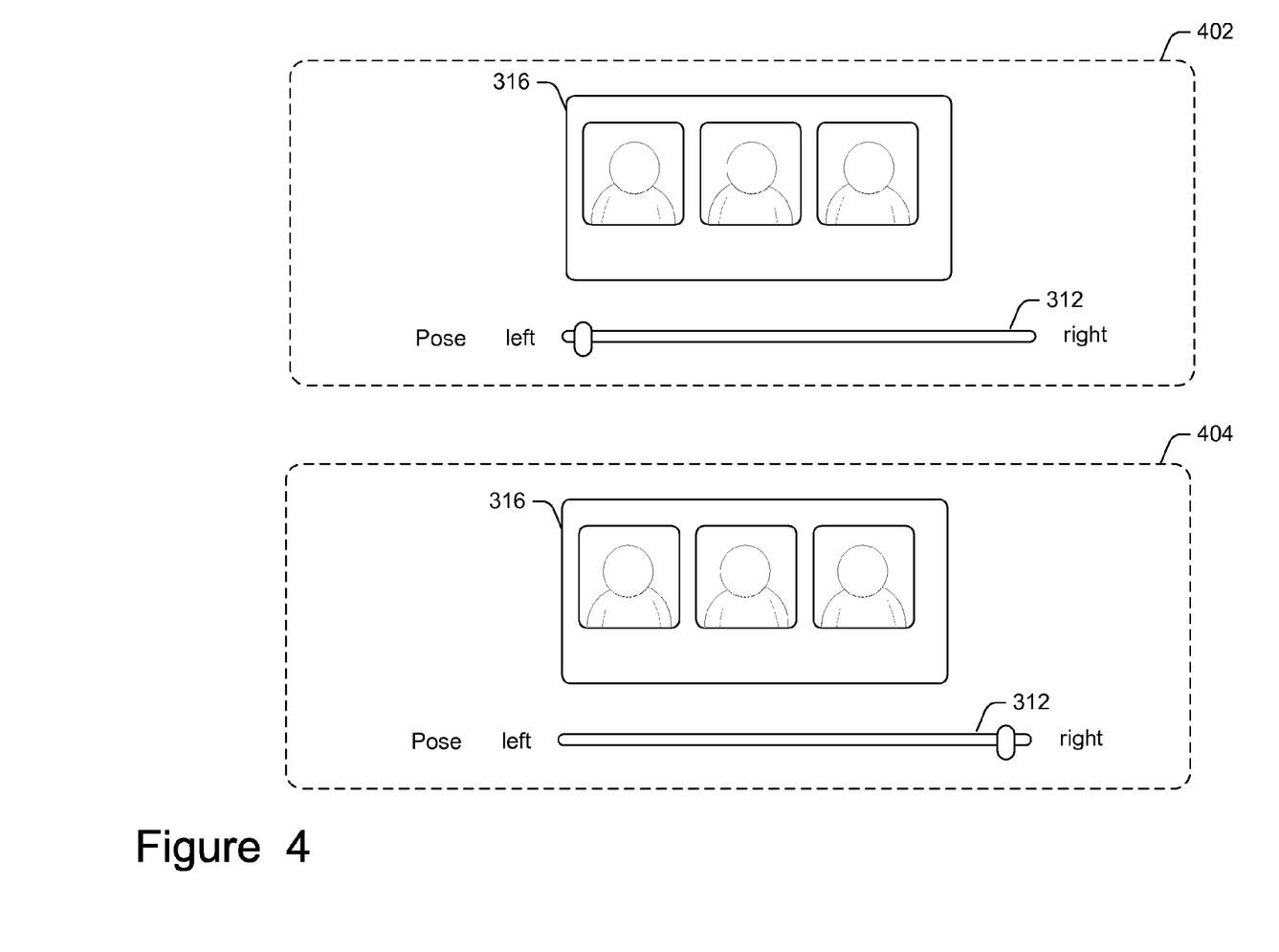
FIG. 4 illustrates the functionality of a pose control component of a user interface of an exemplary cartoon personalization system, in accordance with various embodiments.

FIG. 4 illustrates the functionality of the pose control component of a user interface in accordance with various embodiments. When a user drags the slider bar of the pose control 312 to a position that corresponds to the desired pose orientation, the candidate faces with the same orientation, and/or close approximations of the desired preference may be displayed in the display area 314. For example, as shown in scenario 402, the slider bar on the pose control 312 may be set proximate to the "left" orientation. As a result, face images that do not have a "left" orientation, as determined by the face pose module 222, may be excluded. In turn, the display area 314 may display face images that have the desired "left" orientation. Likewise, as shown in scenario 404, the slider bar on the pose control 312 may be set to proximate the "right" orientation. Thus, face images that do not have a "right" orientation, as determined by the face pose module 222, may be excluded. In turn, the display area 314 may display face images that have the desired "right" orientation.

Returning to FIG. 3, the user interface 300 may also display the cartoon image 316 that has been selected by a user for integration with a face image. In one embodiment, the user may select the cartoon image 316 via an affirmative action (e.g., clicking, dragging, etc.). Moreover, the user interface 300 may also display a final integrated image 318 that is produced from the cartoon image 316 and one of the face images the user selected from the display area 314. As shown in FIG. 3, the face of a character in the cartoon image 316 may be replaced to generate the integrated image 318.

Exemplary Processes

Figure 5:
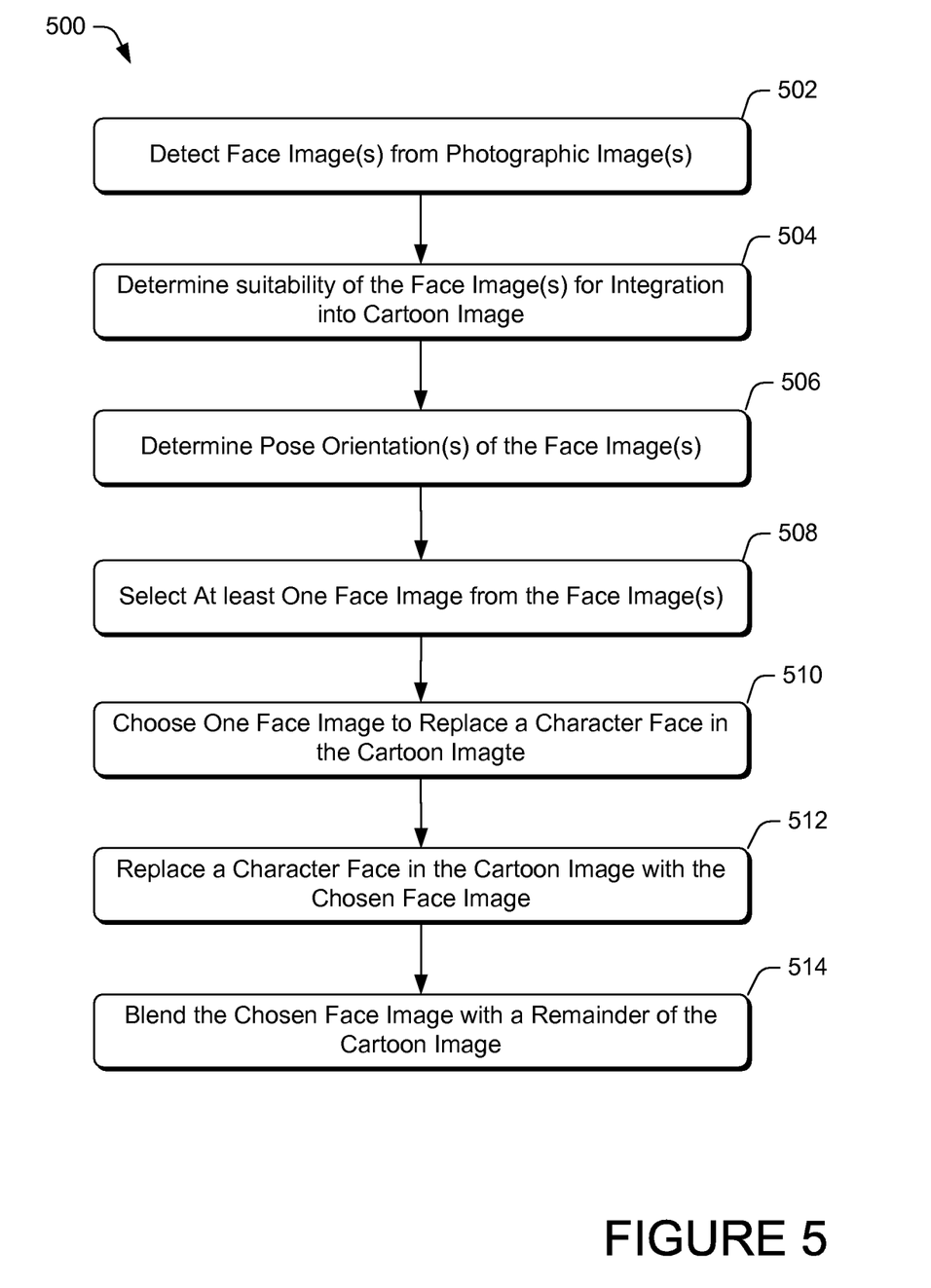
FIG. 5 is a flow diagram illustrating an exemplary process for cartoon personalization, in accordance with various embodiments.
Figure 6:
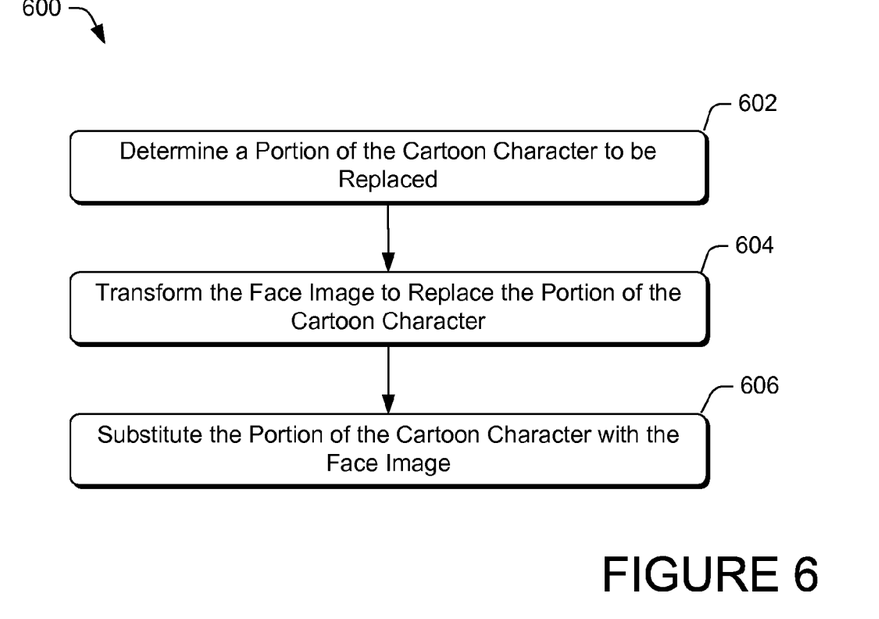
FIG. 6 is a flow diagram illustrating an exemplary process for replacing the facial features of a cartoon character with the face image from a photographic image, in accordance with various embodiments of cartoon personalization.
Figure 7:
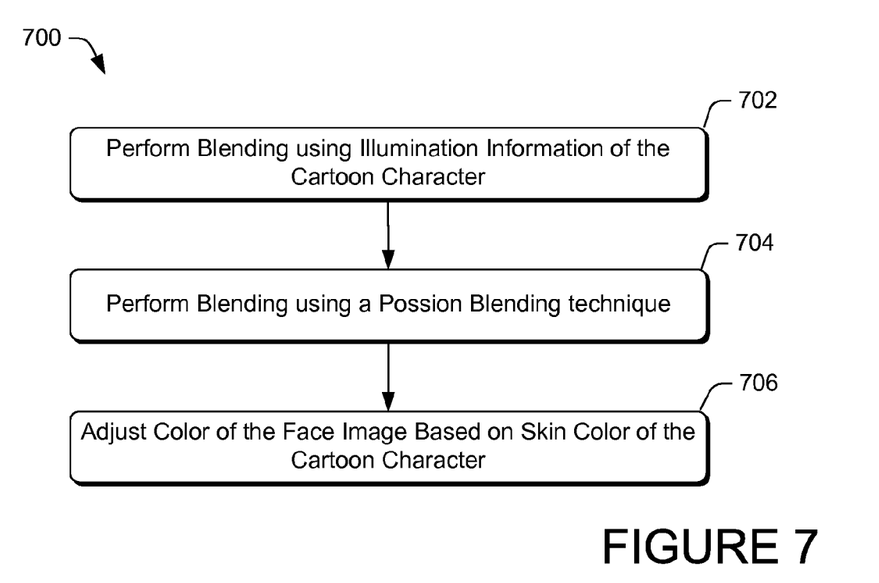
FIG. 7 is a flow diagram illustrating an exemplary processing for blending the face image with the cartoon character, in accordance with various embodiments of cartoon personalization.

FIGS. 5-7 illustrate exemplary processes that facilitate cartoon personalization via the replacement of the facial features cartoon character with the face image from a photographic image. The exemplary processes in FIGS. 5-7 are illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to the exemplary cartoon personalization engine 110 of FIG. 1, although they may be implemented in other system architectures.

FIG. 5 is a flow diagram illustrating an exemplary process 500 for cartoon personalization, in accordance with various embodiments.

At block 502, the cartoon personalization engine 110 may detect one or more face images from at least one photographic image, such as source images 104. In some embodiments, a face image may be detected from photographic images via an integral image technique. In other embodiments, the face images may be detected from the photographic images via a multiview technique.

At block 504, the cartoon personalization engine 110 may determine the suitability of the face images for integration with a cartoon image. In various embodiments, the cartoon personalization engine 110 may determine the suitability based on a determination of whether each of the face images is within acceptable illumination range. In other embodiments, suitability may be determined by the cartoon personalization engine 110 based on whether the image exceeds a minimum resolution threshold. In some embodiments, the upper and lower bounds of the illumination range, and/or the minimum resolution threshold may be supplied to the cartoon personalization engine 110 by a user via the user interface.

At block 506, the cartoon personalization engine 110 may determine the pose orientation of each of the face images. In various embodiments, the pose orientation of a face image, also referred to as face orientation, may be determined based on landmarks extracted from the face image. In turn, the landmarks may be extracted from the face image by using a Bayesian Tangent Shape Model (BTSM).

At block 508, the cartoon personalization engine 110 may enable a user to select at least one of the detected face images as a candidate face image for integration with a cartoon image. In some embodiment, the cartoon personalization engine 110 may provide a user interface, such as user interface 300, which enables the user to select the candidate face images based on criteria such as the desired pose orientation, the desired size of the image, and the desired brightness for the candidate face images. In other embodiments, the cartoon personalization engine 110 may enable user to browser different groups of faces images for the selection of candidate face images. In these embodiments, the cartoon personalization engine 110 may have organized the groups based on the similarity between the face images. For example, face images may be organized into a group in the descending order of similarity according to user input.

At block 510, the cartoon personalization engine 110 may enable a user to choose a particular candidate face image for integration with the cartoon image. In various embodiments, the user may select the particular candidate face image via a user interface, such as the user interface 300.

At block 512, the cartoon personalization engine 110 may replace a face of a cartoon character in the cartoon image with the chosen face image using a transformation technique.

At block 514, the cartoon personalization engine 110 may complete the integration of face image into the cartoon image to synthesize a transformed image, such as the personalized cartoons 114 (FIG. 1), using various blending techniques.

FIG. 6 is a flow diagram illustrating an exemplary process 600 for replacing a portion of a cartoon character with the face image from a photographic image, in accordance with various embodiments. FIG. 6 may further illustrate block 512 of the process 500.

At block 602, the cartoon personalization engine 110 may determine a portion of the cartoon character in a cartoon image to be replaced via an affine transform. The portion of the cartoon character to be replaced may include the face of the cartoon character.

At block 604, the face image chosen to replace the portion of the cartoon character may be transformed via the affine transform. In various embodiments, the cartoon personalization engine 110 may use the affine transform to warp the face image for integration with the cartoon character.

At block 606, the cartoon personalization engine 110 may substitute the portion of the cartoon character with the transformed face image.

FIG. 7 is a flow diagram illustrating an exemplary processing 700 for blending the face image inserted into the cartoon character with other portions of the cartoon character, in accordance with various embodiments. FIG. 7 may further illustrate block 514 of the process 500.

At block 702, the cartoon personalization engine 110 may perform blending using illumination information of the cartoon character that is being transformed. The illumination information may include shading information, as originally implied by a graphical creator of the cartoon character through shading.

At block 704, the cartoon personalization engine 110 may perform further blending by using a Poisson blending technique.

At block 706, the cartoon personalization engine may adjust the color of the face image that is inserted into the cartoon character based on the original coloring of the cartoon character face.

Exemplary Computing Environment

Figure 8:
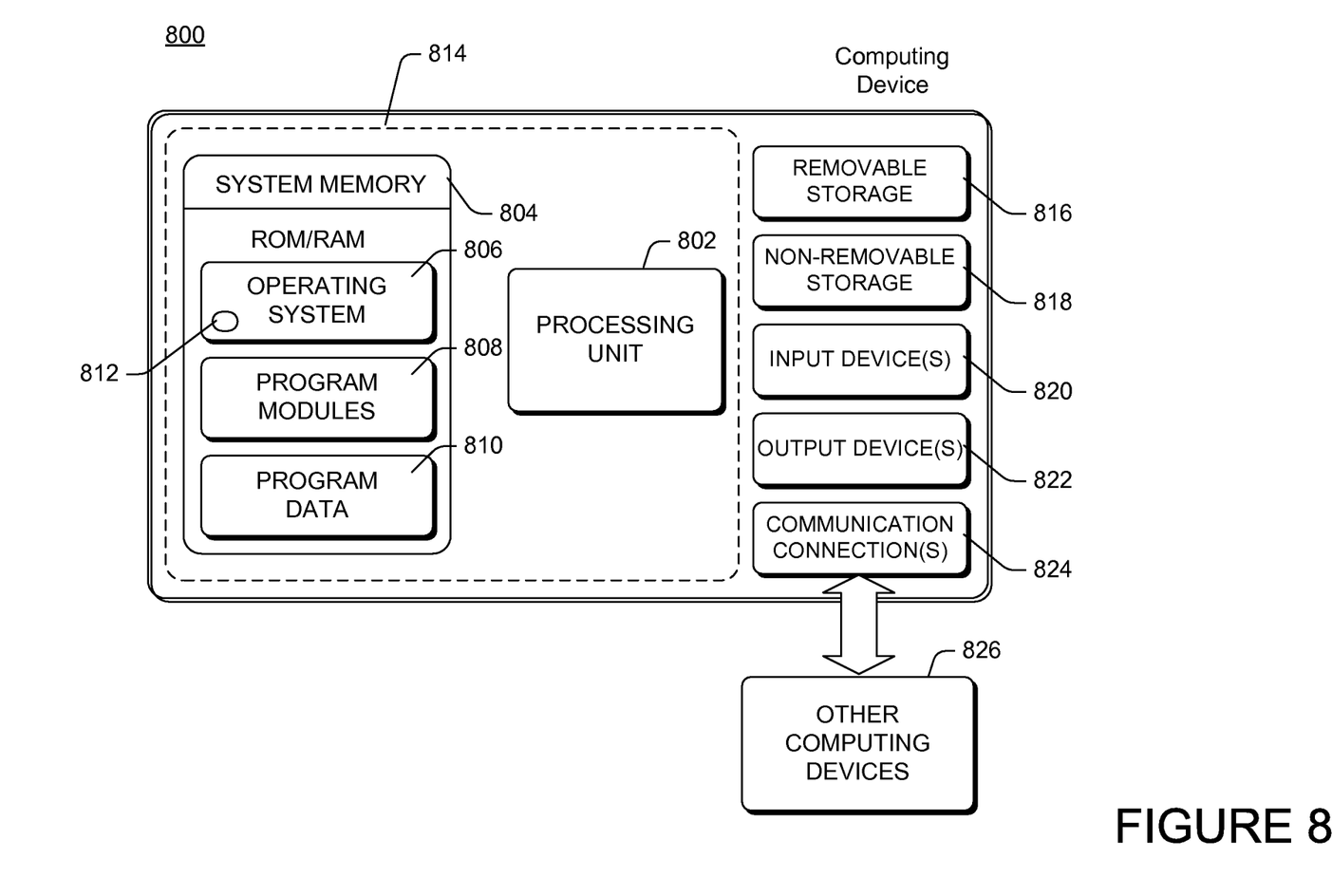
FIG. 8 is a block diagram illustrating a representative computing device on which cartoon personalization operations, in accordance with various embodiments, may be implemented.

FIG. 8 illustrates a representative computing environment 800 that may be used to implement techniques and mechanisms for cartoon personalization, in accordance with various embodiments described herein. The cartoon personalization engine 110, as described in FIG. 1, may be implemented in the computing environment 800. However, it will readily appreciate that the techniques and mechanisms may be implemented in other computing devices, systems, and environments. The computing environment 800 shown in FIG. 8 is only one example of a computing device and is not intended to suggest any limitation as to the scope of use or functionality of the computer and network architectures. Neither should the computing environment 800 be interpreted as having any dependency or requirement relating to any one or combination of components illustrated in the example computing device.

In a very basic configuration, computing device 800 typically includes at least one processing unit 802 and system memory 804. Depending on the exact configuration and type of computing device, system memory 804 may be volatile (such as RAM), non-volatile (such as ROM, flash memory, etc.) or some combination of the two. System memory 804 typically includes an operating system 806, one or more program modules 808, and may include program data 810. The operating system 806 includes a component-based framework 812 that supports components (including properties and events), objects, inheritance, polymorphism, reflection, and provides an object-oriented component-based application programming interface (API), such as, but by no means limited to, that of the .NET™ Framework manufactured by the Microsoft Corporation, Redmond, Wash. The device 800 is of a very basic configuration demarcated by a dashed line 814. Again, a terminal may have fewer components but will interact with a computing device that may have such a basic configuration.

Computing device 800 may have additional features or functionality. For example, computing device 800 may also include additional data storage devices (removable and/or non-removable) such as, for example, magnetic disks, optical disks, or tape. Such additional storage is illustrated in FIG. 8 by removable storage 816 and non-removable storage 818. Computer storage media may include volatile and nonvolatile, removable and non-removable media implemented in any method or technology for storage of information, such as computer readable instructions, data structures, program modules, or other data. System memory 804, removable storage 816 and non-removable storage 818 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of device 800. Computing device 800 may also have input device(s) 820 such as keyboard, mouse, pen, voice input device, touch input device, etc. Output device(s) 822 such as a display, speakers, printer, etc. may also be included. These devices are well known in the art and are not discussed at length here.

Computing device 800 may also contain communication connections 824 that allow the device to communicate with other computing devices 826, such as over a network. These networks may include wired networks as well as wireless networks. Communication connections 824 are some examples of communication media. Communication media may typically be embodied by computer readable instructions, data structures, program modules, etc.

It is appreciated that the illustrated computing device 800 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

The ability to replace the facial features of a cartoon character with a face image from a photographic image may provide personalized cartoon images that are customized to suit the unique taste and personality of a computer user. Thus, embodiments in accordance with this disclosure may provide cartoon images suitable for personalized greeting and communication needs.

Conclusion

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

The invention claimed is:

1. A method comprising:
   detecting one or more face images from at least one photographic image;
   selecting a face image having a pose orientation that substantially matches an original pose orientation of a character in a cartoon image;
   replacing a face of the character in the cartoon image with the face image; and
   blending the face image with a remainder of the character in the cartoon image by operations including:
      converting, by one or more processors, the face image into a color space that includes an illumination channel and a plurality of color channels;
      performing a shading on the illumination channel of the face image based at least in part on illumination information of the cartoon image, the shading including one or more uniform color regions and an illumination value for each region;
      performing an illumination blending after the face image replaces the face of the character in the cartoon image by keeping illumination smooth across the regions; and
      performing color adjustment on the plurality of color channels in the color space.

2. The method of claim 1, further comprising:
   determining a suitability of the face image for integration into the cartoon image, the suitability being based at least in part on whether the face image is within at least one of an acceptable illumination range or greater than a minimal resolution threshold,
   wherein the replacing the face of the character in the cartoon image with the face image includes replacing the face of the character if the face image is suitable for integration into the cartoon image.

3. The method of claim 1, further comprising:
   obtaining one or more landmarks of each detected face image for determining orientation of each face image by using a Bayesian Tangent Shape Model (BTSM) on each face image.

4. The method of claim 1, further comprising grouping the face image with another similar face image using at least one of offline pre-processing or online clustering.

5. The method of claim 1, wherein the replacing includes:
   determining a portion of the character to be replaced-with the face image using an affine transform, the portion including the face of the character;
   transforming the face image to replace the portion of the character via warping using the affine transform; and
   substituting the portion of the character with the transformed face image.

6. The method of claim 1, further comprising:
   determining the pose orientation of the face image by estimating a symmetric axis in a two-dimensional face plane of the face image; and
   calculating the pose orientation based at least in part on a linear distance between facial feature points in a left part of the face image and the symmetric axis and a linear distance between facial feature points in a right part of the image and the symmetric axis.

7. The method of claim 1, further comprising:
selecting a plurality of face images based at least in part on a size of individual ones of the face images or a brightness of individual ones of the face images; and
selecting the face image from the plurality of face images.

8. A memory storing computer-executable instructions that, when executed, cause one or more processors to perform acts comprising:
detecting one or more face images from at least one photographic image;
selecting a face image having a pose orientation that substantially matches an original pose orientation of a character in a cartoon image;
replacing a face of the character in the cartoon image with the face image; and
blending the face image with a remainder of the character in the cartoon image by operations including:
converting the face image into a color space that includes an illumination channel;
performing a shading on the illumination channel of the face image based at least in part on illumination information of the cartoon image, the shading including one or more uniform color regions and an illumination value for each region; and
performing an illumination blending after the face image replaces the face of the character in the cartoon image by keeping illumination smooth across the regions.

9. The memory of claim 8, wherein the color space further includes a plurality of color channels.

10. The memory of claim 9, wherein the operations further include performing color adjustment on the plurality of color channels in the color space.

11. The memory of claim 8, wherein the acts further comprise:
determining a suitability of the face image for integration into the cartoon image, the suitability being based at least in part on whether the face image is within at least one of an acceptable illumination range or greater than a minimal resolution threshold,
wherein the replacing the face of the character in the cartoon image with the face image includes replacing the face of the character if the face image is suitable for integration into the cartoon image.

12. The memory of claim 8, wherein the replacing includes:
determining a portion of the character to be replaced-with the face image using an affine transform, the portion including the face of the character;
transforming the face image to replace the portion of the character via warping using the affine transform; and
substituting the portion of the character with the transformed face image.

13. The memory of claim 8, wherein the acts further comprise:
determining the pose orientation of the face image by estimating a symmetric axis in a two-dimensional face plane of the face image; and
calculating the pose orientation based at least in part on a linear distance between facial feature points in a left part of the face image and the symmetric axis and a linear distance between facial feature points in a right part of the image and the symmetric axis.

14. The memory of claim 8, wherein the acts further comprise:
selecting a plurality of face images based at least in part on a size of individuals ones of the face images or brightness of individual ones of the face images; and
selecting the face image from the plurality of face images.

15. A system comprising:
a face detection engine that detects a plurality of face images from at least one photographic image;
a face pose engine that selects a face image from the plurality of face images, the face image having a pose orientation that matches an original pose orientation of a character in a cartoon image;
a geometry engine that replaces a face of the character in the cartoon image with the face image; and
a blending engine that blends the face image with a remainder of the character in the cartoon image by operations including:
converting the face image into a color space that includes an illumination channel;
performing a shading on the illumination channel of the face image based at least in part on illumination information of the cartoon image, the shading including one or more uniform color regions and an illumination value for each region; and
performing an illumination blending after the face image replaces the face of the character in the cartoon image by keeping illumination smooth across the regions.

16. The system of claim 15, wherein the color space further includes a plurality of color channels.

17. The system of claim 16, wherein the operations further include performing color adjustment on the plurality of color channels in the color space.

18. The system of claim 15, wherein the geometry engine replaces the face of the character with the face image by:
determining a portion of the character to be replaced-with the face image using an affine transform, the portion including the face of the character;
transforming the face image to replace the portion of the character via warping using the affine transform; and
substituting the portion of the character with the transformed face image.

19. The system of claim 15, wherein the face pose engine further:
determines the pose orientation of the face image by estimating a symmetric axis in a two-dimensional face plane of the face image; and
calculates the pose orientation based at least in part on a linear distance between facial feature points in a left part of the face image and the symmetric axis and a linear distance between facial feature points in a right part of the image and the symmetric axis.

20. The system of claim 15, further comprising a user interface module that provides a user interface for a user to select the cartoon image.

* * * * *